April 27, 1954     H. C. LANDRETH     2,676,810
WORKPIECE BACKSTOP FOR LATHE COLLET CHUCKS
Filed Jan. 11, 1952
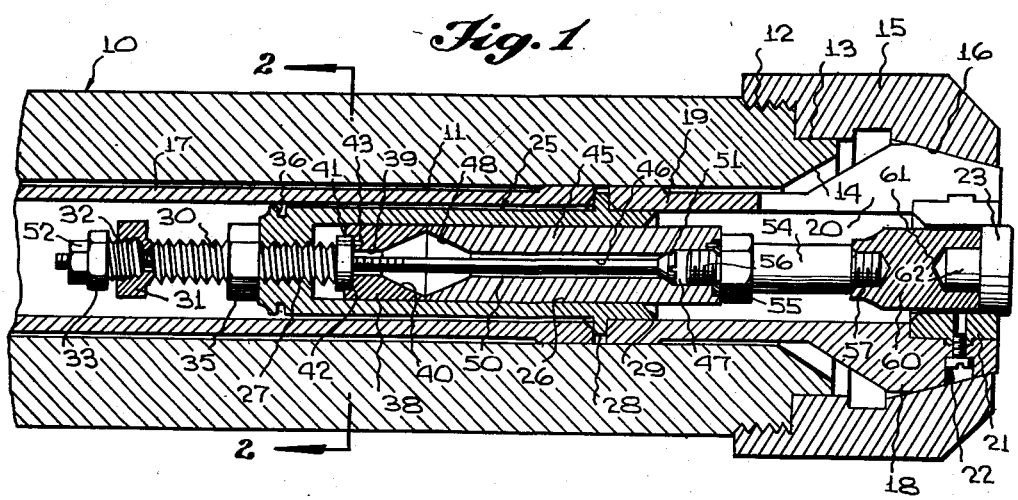
INVENTOR
HERSCHELL C. LANDRETH
BY
McMorrow, Berman + Davidson
ATTORNEYS

Patented Apr. 27, 1954

2,676,810

UNITED STATES PATENT OFFICE 2,676,810

WORKPIECE BACKSTOP FOR LATHE COLLET CHUCKS

Herschell C. Landreth, Indianapolis, Ind.

Application January 11, 1952, Serial No. 266,059

8 Claims. (Cl. 279—51)

This invention relates to work-engaging backstops for lathe head spindles, and more particularly to an adjustable work-supporting backstop adapted to be positioned in the bore of a tubular lathe head spindle carrying a collet chuck to assist in supporting work pieces in the chuck.

It is among the objects of the invention to provide an improved backstop adapted to be mounted in the bore of a tubular lathe head spindle to engage the ends of work pieces disposed in the bore of the spindle and received in a collet chuck mounted in the spindle; which is adjustable in length to engage work pieces having different lengths disposed within the spindle bore; which is held in the spindle by the collet chuck-closing thrust tube; which maintains a work piece secured in the chuck against movement inwardly of the chuck and a flat end of a work piece substantially perpendicular to the rotational axis of the spindle; and which is simple and durable in construction, economical to manufacture, easy to install, and positive and effective in operation.

Other objects and advantages will become apparent from a consideration of the following description and the appended claims in conjunction with the accompanying drawing, wherein:

Figure 1 is a longitudinal medial cross-sectional view of a tubular lathe head spindle and a backstop illustrative of the invention operatively mounted in the spindle;

Figure 2 is a transverse cross-sectional view on the line 2—2 of Figure 1;

Figure 3 is a view similar to Figure 1, but showing the backstop adjusted to receive a work piece of a different length within the spindle bore from that illustrated in Figure 1; and Figure 4 is a side elevational view of a somewhat modified form of tip holder for the back stop.

With continued reference to the drawing, the lathe head spindle, generally indicated at 10, comprises a body of cylindrical shape having a cylindrical bore 11 extending coaxially therethrough and is provided at one end with external screw-threads 12. The screw-threaded end of the spindle body is provided with an extension 13 of reduced diameter and with a beveled formation 14 at the corresponding end of the bore 11. The head spindle 10 is mounted in a suitable bearing on the lathe frame, and rotationally driven by suitable mechanism, such as gear trains of different speed ratios, not illustrated but well known to the art.

A collet hood or closing sleeve 15, in the form of a large, internally screw-threaded nut, is threaded onto the screw-threads 12 on the spindle 10 and has a bore extending coaxially therethrough, the outer portion of the bore being of partly conical shape and inwardly tapering in a direction away from the screw-threaded end of the spindle, as indicated at 16.

A chuck-closing thrust tube 17 is slidably disposed in the bore 11 of the spindle and extends to a location intermediate the length of the bore, suitable means being connected to the thrust tube at the end of the spindle remote from the hood 15 for forcing the thrust tube toward the head to close a collet chuck disposed in the spindle bore between the tapered internal surface of the hood and the adjacent end of the thrust tube, and a collet chuck 18 has a sleeve portion 19 extending inwardly of the bore 11 to a location adjacent the end of the thrust tube 17 and movable jaws 20 externally tapered in two directions to fit the adjacent flared end of the spindle and the tapered internal surface of the chuck-closing hood or sleeve 15.

A collet bushing 21 is disposed in the end of the collet chuck remote from the thrust tube 17 and comprises three separate pieces respectively overlapping the inner surfaces of the three separate collet chuck jaws and secured to the latter by set screws 22 extending one through each chuck jaw and into a radially disposed aperture in the corresponding bushing part. A work piece 23 is shown mounted in the collet chuck and extending from the outer end thereof. In the arrangement shown in Figure 1, the work piece 23 is substantially in the form of a flat disc having one end or side thereof projecting from the collet chuck for chamfering of the peripheral edge and smoothing of the end surface by a lathe-carried tool.

The backstop assembly includes a body, generally indicated at 25, of elongated cylindrical shape having a bore 26 extending coaxially thereof from one end to a location adjacent the other end thereof and a tapped hole 27 extending from the inner end of the bore 26 to the adjacent end of the body substantially coaxial of the body. An external annular rib 28 is provided on the body 25 spaced from, but adjacent to the end of the body to which the bore 26 opens, and this end of the body is inwardly beveled, as indicated at 29. The rib 28 has side surfaces substantially perpendicular to the longitudinal center line or axis of the body 25, and is clamped between the adjacent ends of the thrust tube 17 and the chuck sleeve 19 to hold the body 25 in the bore of the head spindle and against the inner end of the chuck. The outside diameter of the body 25 is substantially the same as the internal diameters of the thrust tube 17 and chuck 19, so that the body 25 is held in the bore of the head spindle against lateral or radial movement.

A tubular bolt 30 is threaded through the tapped hole 27 in the body 25 and has a polygonal head 31 on its end disposed outwardly of the body 25, and a screw-threaded counterbore 32 in the head 31. In the arrangement illustrated in Figure 1, a swivel connector 33 is threaded into the counterbore 32 in the head 31 of the bolt 30 for connecting a lubricant supply line to the bolt for supplying lubricant through the tubular bolt to a work piece disposed within the bore of the spindle. A lock nut 35 is threaded on the bolt and bears against the adjacent end of the body 25, and the body is provided near the end engaged by the lock nut 35 with angularly spaced apart recesses 36 for the engagement of a spanner wrench with the body so that the lock nut 35 can be tightened or loosened, and the bolt 30 threaded inwardly or outwardly through the tapped hole 27.

A first abutment block 38 is disposed in the bore 26 of the body 25 with one end adjacent the end of the bolt 30 disposed inwardly of the bore 26. This abutment block 38 is of cylindrical shape and has a bore 39 extending coaxially therethrough and outwardly flared at the end of the body remote from the bolt 30 to provide a recess 40 of conical shape disposed coaxially of the abutment block and tapering inwardly from the end of the block remote from the bolt.

A second abutment block 45 is disposed in the bore 26 of the body 25 and has a bore 46 extending coaxially therethrough. At one end of the body 45 the bore 46 is enlarged and screw-threaded to provide a screw-threaded counterbore 47, and at the other end of the second abutment block the bore 46 is outwardly flared to provide in this end of the abutment block an inwardly tapering, coaxially disposed recess 48 of conical shape. The end of the second abutment block 45 having the recess 48 therein is disposed against the end of the first abutment block 38 having the recesses 40 therein, and a tie bolt 50 extends through the bores of the blocks 45 and 38 through the bolt 30. The bolt 50 has a head 51 disposed in the counterbore 47 and bearing against the inner end of this counterbore, and a nut 52 is threaded onto the other end of the tie bolt and bears against the fitting 33 so that the tie bolt secures the blocks 45 and 38, and the bolt 30 together in end-to-end relationship to each other. A binding nut 41 is threaded onto bolt 50 and bears against the end of block 38 remote from block 45 and is partially received in a recess 42 in the adjacent end of block 38. A dowel pin 43 disposed in registering recesses in nut 41 and block 38 holds the nut against rotation relative to the block. The end of the tip 60 remote from the holder 54 is carefully machined to a flat condition, so that the face of the work piece 23 bearing against the adjacent end of the tip 60 is held perpendicular to the axis of the head spindle 10. As the collet chuck 20 holds the work piece against rotation relative to the spindle and against lateral movement and the backstop hereinabove described holds the work piece against tilting in the chuck, the portion of the work piece projecting from the chuck can be accurately machined to a desired shape.

For a longer work piece, a shorter tip holder, as indicated at 54' and particularly illustrated in Figure 4, may be substituted for the tip holder 52 shown in Figure 1. The tip holder 54', except for being shorter than the tip holder 54, is otherwise similar and has a shank portion with a polygonal formation 55' at one end of the shank portion for engagement by a wrench and screw-threaded terminal extensions 56' and 57' corresponding to the extensions 56 and 57 of the tip holder 54 and utilized for the same purpose.

Tip holders may be provided in sets of different lengths for different thicknesses or lengths of work pieces, the tip 60 may also be provided in sets of different lengths, and the abutment blocks 38 may be provided in sets of different lengths so that the backstop can be adjusted for work pieces varying in length by small increments. For a work piece of sufficient length, the abutment block 38 may be omitted entirely, and the abutment block 45 turned end to end and utilized to receive the adjacent end of a work piece in the recess 48 therein.

In the arrangement shown in Figure 3, the backstop is set up for a length of work piece 65 which projects into the bore of the head spindle much further than the work piece 23 of Figure 1. In this case, the abutment block 45, the tip holder 54 and the tip have all been omitted, and the end of the work piece disposed inwardly of the spindle is received in the conical recess 40 in the short abutment block 38.

An annular spacer 66 is disposed between the bolt 30 and the adjacent end of the abutment block 38, and this spacer is provided with an aperture 67 registering with the bore 39 of the abutment block and with a washer-receiving aperture corresponding to the washer-receiving aperture in the adjacent end of the abutment block. Washers 68 and 69 are disposed in the recesses in washer-receiving recesses in the spacer 66 and in the abutment block 38, respectively, and bear against each other, these washers being provided with apertures through which the bore 39 of the abutment block communicates with the bore of the tubular bolt 30.

A swivel connector 80 is attached to the head 31 of the bolt 30. As shown in Figure 3, the connector 80 carries a nut 81 which has a threaded projection 82, the projection being threaded into the threaded bore 32 of the head 31 of the bolt 30. Otherwise than as explained above, the arrangement illustrated in Figure 3 is the same as that illustrated in Figure 1, except that the collet chuck 21' in Figure 3 may have a smaller opening therethrough in case the work piece 65 is of smaller diameter than the work piece 23 of Figure 1.

The various components of the backstop may be assembled in different selected combinations to accommodate different work pieces within the bore of the head spindle, and, where the components of the backstop are provided in sets, the components of the proper dimensions for the particular operating condition will be selected for the assembly. The omission or inclusion of different components in various assemblies, however, in no way affects the scope of the invention.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within

What is claimed is:

1. A work piece support adapted to be mounted in a tubular lathe head spindle bore comprising a body of elongated cylindrical shape having a coaxial bore extending from one end to a location adjacent the other end thereof and a coaxially disposed tapped hole extending from the inner end of said bore to the said other end of said body, said body also having an external annular rib disposed intermediate the length thereof and adapted to be positioned between the adjacent ends of a thrust tube and a collet chuck sleeve within the bore of an associated lathe spindle, a bolt extending through said tapped hole, an abutment block disposed within the bore of said body, and a washer disposed between the end of said bolt within the bore of said body and the adjacent end of said abutment block, said abutment block having in its other end an inwardly tapered recess of conical shape disposed coaxially of the abutment block for engaging the adjacent end of a work piece extending into the bore of the spindle.

2. A work piece support adapted to be mounted in a tubular lathe head spindle bore comprising a body of elongated cylindrical shape having a coaxial bore extending from one end to a location adjacent the other end thereof and a coaxially disposed tapped hole extending from the inner end of said bore to said other end of said body, said body also having an external annular rib disposed intermediate the length thereof and adapted to be positioned between the adjacent ends of a thrust tube and a collet chuck sleeve within the bore of an associated lathe spindle, a bolt extending through the tapped hole in said body, a first abutment block disposed within the bore of said body with one end supported by the inner end of said bolt, said abutment block having in its other end an inwardly tapering recess of conical shape disposed coaxially thereof, a second abutment block disposed in said body with one end against said other end of said first abutment block and having a bore extending coaxially therethrough and an internally screw-threaded counterbore at the end of the bore therein remote from said first abutment block, a tip holder threaded at at one end and into said counterbore and extending longitudinally from said second abutment block, and a tip threaded at one end on the other end of said tip holder for supporting a work piece at its other end.

3. A work piece support adapted to be mounted in a tubular lathe head spindle bore comprising a body of elongated cylindrical shape having a coaxial bore extending from one end to a location adjacent the other end thereof and a coaxially disposed tapped hole extending from the inner end of said bore to said other end of said body, said body also having an external annular rib disposed intermediate the length thereof and adapted to be positioned between the adjacent ends of a thrust tube and a collet chuck sleeve within the bore of an associated lathe spindle, a tubular bolt extending through the tapped hole in said body, a first abutment block disposed within the bore of said body means on the inner end of said bolt engaging the adjacent end of said first abutment block to adjustably position said first abutment block longitudinally of said body, said abutment block having in its other end an inwardly tapering recess of conical shape disposed coaxially thereof, a second abutment block disposed in said body with one end against the adjacent end of said first abutment block and having a bore extending coaxially therethrough and an internally screw-threaded counterbore at the end of the bore therein remote from said first abutment block, a tip holder threaded at one end into said counterbore and extending longitudinally from said second abutment block, a tip threaded at one end on the other end of said tip holder for supporting a work piece at its other end, and a tie bolt extending through and securing said abutment blocks, and said tubular bolt together in end-to-end relationship.

4. In combination with a lathe head spindle having a coaxial bore, a thrust tube in said bore terminating at one end intermediate the length of said bore, a chuck-closing hood on one end of said spindle and a collet chuck extending into said bore and terminating at one end adjacent said one end of said thrust tube, a work piece-supporting backstop disposed in the bore of said spindle and comprising a body of elongated cylindrical shape having intermediate its length an external rib secured between the adjacent ends of said thrust tube and said chuck and having a coaxial bore extending from one end to a location adjacent the other end thereof and a coaxially disposed tapped hole extending from the inner end of the bore therein to said other end thereof, an adjustment bolt threaded through said tapped hole into the bore in said body, and work piece-abutment means disposed in the bore in said body and against the adjacent end of said adjustment bolt.

5. In combination with a lathe head spindle having a coaxial bore, a thrust tube in said bore terminating at one end intermediate the length of said bore and a collet chuck extending into said bore and terminating at one end adjacent said one end of said thrust tube, a work piece-supporting backstop disposed in the bore of said spindle and comprising a body of elongated cylindrical shape having intermediate its length an external rib disposed between the adjacent ends of said thrust tube and said chuck and having a coaxial bore extending from one end to a location adjacent the other end thereof and a coaxially disposed tapped hole extending from the inner end of the bore therein to said other end thereof, an adjustment bolt threaded through said tapped hole into the bore in said body, and work piece abutment means disposed in the bore in said body and against the adjacent end of said adjustment bolt, said abutment means including an abutment block having an inwardly tapering recess of conical shape in the end thereof remote from said adjusting bolt.

6. In combination with a lathe head spindle having a coaxial bore, a thrust tube in said bore terminating at one end intermediate the length of said bore and a collet chuck extending into said bore and terminating at one end adjacent said one end of said thrust tube, a work piece-supporting backstop disposed in the bore of said spindle and comprising a body of elongated cylindrical shape having intermediate its length an external rib disposed between the adjacent ends of said thrust tube and said chuck and having a coaxial bore extending from one end to a location adjacent the other end thereof and a coaxially disposed tapped hole extending from the inner end of the bore therein to said other end thereof, an adjustment bolt threaded through said tapped hole into the bore in said body, work piece-abutment means disposed in the bore in said body and against the adjacent end of said adjustment bolt, said abutment means including abutment blocks disposed in end-to-end relationship, and a work-engaging tip carried by the abutment block remote from said adjustment bolt at the end thereof remote from said bolt.

7. In combination with a lathe head spindle having a coaxial bore, a thrust tube in said bore terminating at one end intermediate the length of said bore and a collet chuck extending into said bore and terminating at one end adjacent said one end of said thrust tube, a work piece-supporting backstop disposed in the bore of said spindle and comprising a body of elongated cylindrical shape having intermediate its length an external rib disposed between the adjacent ends of said thrust tube and said chuck and having a coaxial bore extending from one end to a location adjacent the other end thereof and a coaxially disposed tapped hole extending from the inner end of the bore therein to said other end thereof, an adjustment bolt threaded through said tapped hole into the bore in said body, and work piece-abutment means disposed in the bore in said body and against the adjacent end of said adjustment bolt, said abutment means including abutment blocks disposed in end-to-end relationship, a work-engaging tip carried by the abutment block remote from said adjustment bolt at the end thereof remote from said bolt, and a tip holder interposed between said tip and the tip-carrying abutment block.

8. In combination with a lathe head spindle having a coaxial bore, a thrust tube in said bore terminating at one end intermediate the length of said bore and a collet chuck extending into said bore and terminating at one end adjacent said one end of said thrust tube, a work piece-supporting backstop disposed in the bore of said spindle and comprising a body of elongated cylindrical shape having intermediate its length an external rib disposed between the adjacent ends of said thrust tube and said chuck and having a coaxial bore extending from the end thereof adjacent said chuck to a location adjacent the other end thereof and a coaxially disposed tapped hole extending from the inner end of the bore therein to said other end thereof, an adjustment bolt threaded through said tapped hole into the bore in said body, an abutment block disposed in the bore in said body and against the adjacent end of said adjustment bolt, said abutment block and said bolt having mutually registering bores extending therethrough, and a fitting secured to the end of said bolt remote from said abutment block and communicating with the bore in said bolt for attaching a lubricant conduit to said bolt.

References Cited in the file of this patent
UNITED STATES PATENTS

| Number | Name | Date |
|---|---|---|
| 1,603,531 | Flaherty | Oct. 19, 1926 |
| 2,415,482 | Greenough | Feb. 11, 1947 |